(12) United States Patent
Chen et al.

(10) Patent No.: US 11,353,687 B2
(45) Date of Patent: Jun. 7, 2022

(54) LENS MODULE, CAMERA, AND DRIVER ASSISTANT SYSTEM

(71) Applicant: JIANGXI LIANCHUANG ELECTRONIC CO., LTD., Nanchang (CN)

(72) Inventors: Weijian Chen, Nanchang (CN); Yumin Bao, Nanchang (CN); Xuming Liu, Nanchang (CN); Jiyong Zeng, Nanchang (CN); Kemin Wang, Nanchang (CN); Zhuo Wang, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 339 days.

(21) Appl. No.: 16/744,145

(22) Filed: Jan. 15, 2020

(65) Prior Publication Data

US 2020/0150399 A1    May 14, 2020

Related U.S. Application Data

(63) Continuation of application No. PCT/CN2019/085195, filed on Apr. 30, 2019.

(30) Foreign Application Priority Data

Jun. 19, 2018 (CN) .......................... 201810629640.7

(51) Int. Cl.
*G02B 13/00* (2006.01)
*G02B 13/04* (2006.01)
(Continued)

(52) U.S. Cl.
CPC ........... *G02B 13/0045* (2013.01); *G02B 9/60* (2013.01); *G02B 13/006* (2013.01); *G02B 13/04* (2013.01); *B60R 11/04* (2013.01)

(58) Field of Classification Search
CPC .. G02B 13/0045; G02B 13/006; G02B 13/04; G02B 9/60; G02B 9/62; G02B 9/64; G02B 27/0025
(Continued)

(56) References Cited

U.S. PATENT DOCUMENTS 5,493,446 A * 2/1996 Nakajima ................. G02B 9/34
                                                            359/650
5,946,505 A * 8/1999 Lee .......................... G03B 19/12
                                                            396/152
(Continued)

FOREIGN PATENT DOCUMENTS

CN       103576290 A       2/2014
CN       103676092 A †     3/2014
(Continued)

OTHER PUBLICATIONS

International Search Report issued in corresponding International application No. PCT/CN2019/285195, dated Jul. 30, 2019(8 pages).
(Continued)

*Primary Examiner* — Jordan M Schwartz (57) ABSTRACT

The present disclosure provides a lens module, a camera, and a driver assistant system. From an object side to an image side, the lens module sequentially includes a first lens with a negative refractive power, a second lens with a negative refractive power, a third lens with a positive refractive power, a stop, a fourth lens with a positive refractive power, a fifth lens with a negative refractive power, a sixth lens with a positive refractive power, and a filter. The fifth lens and the fourth lens constitute a bonding lens group. The second lens, the third lens, the fourth lens, and the fifth lens are glass spherical lenses, and the first lens and the sixth lens are both glass aspherical lenses. The lens module significantly increases the distortion in a small FOV (Continued)

to meet the special algorithm requirements of an in-vehicle system.

18 Claims, 5 Drawing Sheets

(51) Int. Cl.
    *G02B 9/60*     (2006.01)
    *B60R 11/04*     (2006.01)

(58) Field of Classification Search
    USPC .............................. 359/713, 714, 762, 770
    See application file for complete search history.

(56) References Cited

U.S. PATENT DOCUMENTS

| | | | |
|---|---|---|---|
| 2006/0274433 A1 | 12/2006 | Kamo | |
| 2013/0114150 A1* | 5/2013 | Kwon | G02B 5/208 359/713 |
| 2013/0194681 A1* | 8/2013 | Ohashi | G02B 13/0045 359/738 |
| 2013/0286488 A1* | 10/2013 | Chae | G02B 13/0045 359/714 |
| 2017/0242220 A1* | 8/2017 | Lee | G02B 13/06 |
| 2017/0371133 A1* | 12/2017 | Lai | G02B 13/006 |
| 2018/0203211 A1* | 7/2018 | Kim | G02B 9/64 |
| 2018/0321467 A1† | 11/2018 | Wu | |
| 2019/0154991 A1* | 5/2019 | Kim | G02B 13/0045 |
| 2019/0155006 A1* | 5/2019 | Lin | G02B 13/06 |
| 2019/0331900 A1† | 10/2019 | Yao | |

FOREIGN PATENT DOCUMENTS

| | | |
|---|---|---|
| CN | 204188869 U | 3/2015 |
| CN | 105044885 A | 11/2015 |
| CN | 105892024 A | 8/2016 |
| CN | 106125258 A | 11/2016 |
| CN | 107037570 A | 8/2017 |
| CN | 108072966 | 5/2018 |
| CN | 108681050 A | 10/2018 |
| JP | 2007094032 A | 4/2007 |
| JP | 2007106614 A | 4/2007 |
| JP | 2017228832 A | 12/2017 |

OTHER PUBLICATIONS

First Office Action issued in corresponding China application No. 2018106296407, dated Sep. 4, 2019(13 pages).
Written Opinion of the International Search Authority issued in corresponding international application No. PCT/CN2019/285195, dated Jul. 30, 2019(6 pages).
Office Action for JP Application No. 2020-551432, dated Oct. 12, 2021.

\* cited by examiner
† cited by third party

LENS MODULE, CAMERA, AND DRIVER ASSISTANT SYSTEM

CROSS REFERENCE TO RELATED APPLICATION(S)

This application is a continuation of International Application No. PCT/CN2019/085195, filed on Apr. 30, 2019, titled "VEHICLE LENS". The International Application No. PCT/CN2019/085195 claims priority to a Chinese application No. 201810629640.7, filed on Jun. 19, 2018, titled "VEHICLE LENS". The entirety of the above-mentioned applications is hereby incorporated by reference herein.

TECHNIQUE FIELD

The present disclosure relates to the field of optical lens technologies, and more particularly, to a lens module, a camera, and a driver assistant system.

BACKGROUND

Advanced Driver Assistant System (ADAS) is an active safety solution that assists the driver in detecting possible dangers and even proactively intervenes by collecting and processing information. From a technical perspective, the ADAS builds a bridge for the accumulation of driverless technology, and is a gradual road for car companies to enter into driverless technology. Among various systems of ADAS, image-based assisted driving systems have the highest market share. The main reason is that it is low-cost and can be used in conjunction with the driving recorder, and can provide the detection results to the driver in the form of visual audio and video. Although its detection distance is less than an infrared and radar, it is still popular.

Lane Departure Warning System (LDWS) and Forward Collision Warning System (FCWS) are important to countries around the world. They are the two most important image-based ADAS functions that the industry is rushing to invest in. The main function of LDWS is to capture the scene in front of a vehicle via a camera lens, and then process the image and calculate to generate a result of lane detection. Once the vehicle starts to deviate from the lane without turning on the direction lights, the system will automatically output various warning signals to remind drivers to react immediately to avoid accidents. The main function of FCWS is to capture the scene in front of the vehicle through the camera lens. After processing the image, another vehicles in front is detected and a distance between the two vehicles is estimated. When the two vehicles do not maintain at a proper distance, the system will automatically warn the driver.

With the development of automotive electronics and automotive imaging technology, image algorithms are constantly being updated. For example, the algorithm of the ADAS requires the camera lens to have a great distortion at a small FOV (Field of View). The existing camera lens cannot meet these special algorithm requirements in ADAS.

SUMMARY

The present disclosure aims to provide a lens module, to achieve a large distortion while having a small FOV. The present disclosure further provides a camera, and a driver assistant system.

The disclosure provides a lens module, from an object side to an image side thereof, the lens module sequentially includes:

a first lens with a negative refractive power, whose object side surface is convex and image side surface is concave;

a second lens with a negative refractive power, whose object side surface is concave and image side surface is convex;

a third lens with a positive refractive power, whose object side surface and image side surface are both convex;

a stop;

a fourth lens with a positive refractive power, whose object side surface and image side surface are both convex;

a fifth lens with a negative refractive power, whose object side surface is concave; wherein the fifth lens and the fourth lens constitute a bonding lens group;

a sixth lens with a positive refractive power, whose object side surface is convex; and a filter;

wherein the second lens, the third lens, the fourth lens, and the fifth lens are glass spherical lenses; and the first lens and the sixth lens are both glass aspherical lenses.

The lens module provided by the present disclosure applies a combination of glass spherical surface and aspherical surface to provide a particular distortion for the lens module. Compared with the existing vehicle-mounted lens module, it significantly increases the distortion in a small FOV. It is more conducive to meet the special algorithm requirements of an in-vehicle system. The lens module has a large aperture, improves the resolution of the lens module while effectively controlling the diameter and the length of the lens module, and achieves a small diameter and a large target surface. Meanwhile, by probably matching the glass materials of the lens, the problems of focus shift and sharply reduced resolution in a large temperature difference environment are overcome, thereby ensuring an excellent imaging quality in a large temperature difference environment and meeting the actual needs.

Furthermore, the lens module satisfies the following expression:

$$D_1/(Y_{IH}*f)<0.25;$$

where $D_1$ represents a maximum effective diameter of the first lens, $Y_{IH}$ represents a maximum image circle radius of the lens module, and f represents a focal length of the lens module. Satisfying this expression, characteristics of small diameter and large target surface may be achieved for the lens module under the condition of a fixed focal length.

Furthermore, the lens module satisfies the following expressions:

$$R_1/f<1;$$

$$-3<f_1/f<-1;$$

$$(Y_{12}-Y_{refl2})/Y_{refl2}<-4.5\%;$$

where $R_1$ represents a curvature radius of a center of the object side surface of the first lens, $f_1$ represents a focal length of the first lens, f represents a focal length of the lens module, $Y_{12}$ represents a real image height of the lens module at 12° FOV, and $Y_{refl2}$ represents an ideal paraxial image height of the lens module at 12° FOV. Satisfying these expressions, the distortion of the lens module may be significantly increased in a small FOV, thereby satisfying the algorithm requirements of a vehicle imaging system.

Furthermore, the lens module satisfies the following expression:

$$TTL/f<4.5;$$

where TTL represents an optical total length of the lens module, and f represents a focal length of the lens module. Satisfying this expression, a length of the lens module may be limited effectively.

Furthermore, the lens module satisfies the following expressions:

$$-1.5 < R_{21}/f < -0.8;$$

$$R_{41}/f < 1.8;$$

$$f/R_{52} < 0.2;$$

where $R_{21}$ represents a curvature radius of the object side surface of the second lens, $R_{41}$ represents a curvature radius of the object side surface of the fourth lens, $R_{52}$ represents a curvature radius of the image side surface of the fifth lens, and f represents a focal length of the lens module. Satisfying these expressions, it is possible to effectively improve the performance of ghosting and reduce the energy focused on an image sensor chip (CMOS) of the lens module.

Furthermore, the lens module satisfies the following expressions:

$$R_{61}/f < 2;$$

$$f/f_6 < 0.5;$$

where $R_{61}$ represents a curvature radius of a center of the object side surface of the sixth lens, f represents a focal length of the lens module, and $f_6$ represents a focal length of the sixth lens. Satisfying these expressions, the lens module can reduce the energy focused on the CMOS thereof by the ghosting generated by the reflection on the sixth lens surface.

Furthermore, the lens module satisfies the following expression:

$$f_3/f < 2;$$

wherein $f_3$ represents a focal length of the third lens; f represents a focal length of the lens module. Satisfying this expression, the lens module contributes a positive spherical aberration, which is beneficial to reduce the overall spherical aberration of the imaging system.

Furthermore, the lens module satisfies the following expressions:

$$(dn/dt)4 < -5 \times 10^{-6}/°C.;$$

$$f_4/f < 1.5;$$

wherein $(dn/dt)4$ represents a temperature coefficient of refractive index of the fourth lens, f represents a focal length of the lens module, and $f_4$ represents a focal length of the fourth lens. Satisfying these expressions, the lens module may ensure an excellent imaging quality in a large temperature difference environment.

Furthermore, the lens module satisfies the following expressions:

$$Nd_1 > 1.8, Vd_4 > 55, Vd_5 < 25, Vd_6 > 60;$$

wherein $Vd_4$ represents an abbe number of the fourth lens, $Vd_5$ represents an abbe number of the fifth lens, $Vd_6$ represents an abbe number of the sixth lens, and $Nd_1$ represents a refractive index of the first lens. Satisfying theses expressions, it is conducive to limit the length of the lens module, and it is beneficial to correct lens chromatic aberration.

Furthermore, the shapes of the respective aspherical surfaces of the first lens and the sixth lens satisfy the following expression:

$$z = \frac{ch^2}{1 + \sqrt{1 - (1+K)c^2h^2}} + Bh^4 + Ch^6 + Dh^8 + Eh^{10} + Fh^{12};$$

wherein z represents a vector height between a point on the surface and a vertex of the surface along an optical axis of the lens module; h represents a distance between the point on the surface and the optical axis, c represents a curvature of the vertex of the surface, K represents a quadratic surface coefficient, B represents a fourth order surface coefficient, C represents a sixth order surface coefficient, D represents an eighth order surface coefficient, and E represents a tenth order surface coefficient, F represents a twelfth order surface coefficient.

The lens module that satisfies the above configurations not only maintains a small lens outer diameter and length, but also provide a particular distortion by being equipping with the first lens with a glass aspheric surface. Because the sixth lens include a glass aspheric surface, an astigmatism of the lens module is effectively reduced, and the resolution capability of the lens module is greatly improved. Furthermore, the lens module provided by the present disclosure may optimize the lens ghost by controlling the shape of the lenses and improve the quality of image. The lens module equipped with all glass-made lenses, may ensure the long-term stability of the lens in outdoor high and low temperature environments.

The advantages of the present disclosure will be given in part in the following description, and part of them will become apparent from the following description, or be learned through the practice of the present disclosure.

BRIEF DESCRIPTION OF THE DRAWINGS

The above and/or additional aspects and advantages of the present disclosure will become apparent and easily understood from the description of the embodiments in conjunction with the following drawings, in which.

DETAILED DESCRIPTION OF PREFERRED EMBODIMENTS

In order to facilitate the understanding of the present disclosure, the present disclosure will be described more fully hereinafter with reference to the accompanying drawings. Several embodiments of the disclosure are presented in the drawings. However, the disclosure may be embodied in many different forms and is not limited to the embodiments described herein. Rather, these embodiments are provided so that this disclosure will be thorough and comprehensive.

Unless defined otherwise, all technical and scientific terms used herein have the same meaning as commonly understood by one of ordinary skill in the art to which this disclosure belongs. The terminology items used herein in the description of the present disclosure are only for the purpose of describing specific embodiments, and are not intended to limit the present disclosure. The term "and/or" as used herein includes any and all combinations of one or more of the associated listed items.

Figure 1:
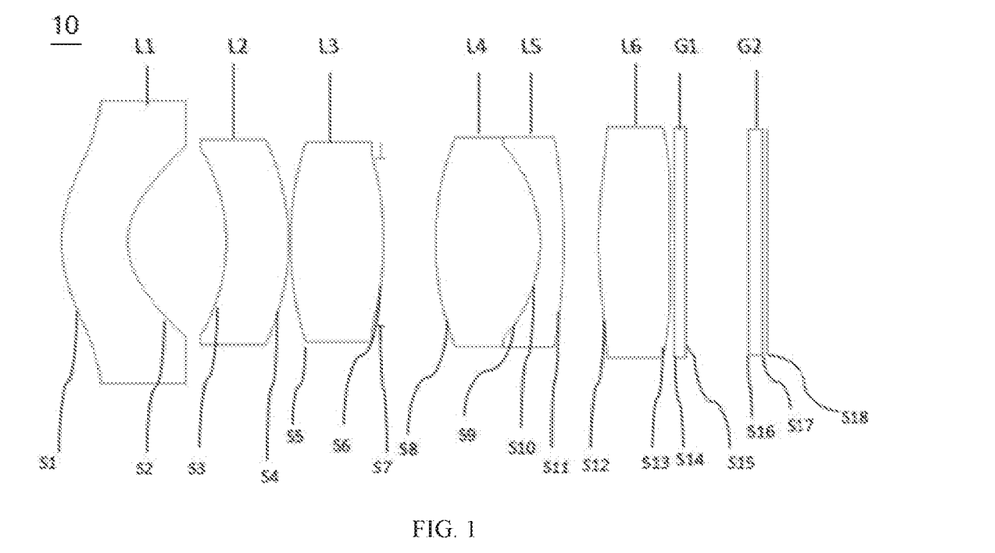
FIG. 1 illustrates a schematic cross-sectional view of the lens module according to a first embodiment of the present disclosure.

As illustrated in FIG. 1, the present disclosure provides a lens module 10, from an object side to an image side thereof, the lens module 10 sequentially includes:

a first lens L1 with a negative refractive power, whose object side surface S1 is convex and image side surface S2 is concave;

a second lens L2 with a negative refractive power, whose object side surface S3 is concave and image side surface S4 is convex;

a third lens L3 with a positive refractive power, whose object side surface S5 and image side surface S6 are both convex;

a stop S7;

a fourth lens L4 with a positive refractive power, whose object side surface S8 and image side surface S9 are both convex;

a fifth lens L5 with a negative refractive power, whose object side surface S10 is concave and image side surface S11 is concave or convex, which is not limited herein;

the fifth lens L5 and the fourth lens L4 constituting a bonding lens group;

a sixth lens L6 with a positive refractive power, whose object side surface S12 is convex, and object side surface S13 is concave or convex, which is not limited herein; and a filter G1, whose object side surface is labeled as S14, and image side surface is labeled as S15;

wherein the second lens L2, the third lens L3, the fourth lens L4, and the fifth lens L5 are glass spherical lenses; the first lens L1 and the sixth lens L6 are both aspherical lenses. In some embodiments, the lens module 10 may further include a cover glass G2, whose object side surface is labeled as S16 and image side surface is labeled as S17. The cover glass G2 is disposed at an image side of the filter G1, and configured to protect the image sensor chip. In an alternative embodiment, the cover glass G2 may be omitted. An image surface of the lens module 10 is labeled as S18. The object side surface S10 of the fifth lens L5 matches with and is bonded to the image side surface S9 of the fourth lens L4, in other words, the fifth lens L5 and the fourth lens L4 are bonded together to form an achromatic doublet lens.

The lens module 10 described above applies a combination of glass spherical surface and aspherical surface to provide a particular distortion for the lens module 10. Compared with the existing vehicle-mounted lens module 10, it significantly increases the distortion in a small FOV. It is more conducive to meet the special algorithm requirements of an in-vehicle system. The lens module 10 has a large aperture, improves the resolution of the lens module 10 while effectively controlling the diameter and the length of the lens module 10, and achieves a small diameter and a large target surface. Meanwhile, by probably matching the glass materials of the lens, the problems of focus shift and sharply reduced resolution in a large temperature difference environment are overcome, thereby ensuring an excellent imaging quality in a large temperature difference environment and meeting the actual needs.

The lens module 10 provided by the present disclosure satisfies the following expression:

$$D_1/(Y_{IH} * f) < 0.25;$$

wherein $D_1$ represents a maximum effective diameter of the first lens L1, $Y_{IH}$ represents a maximum image circle radius of the lens module 10, and f represents a focal length of the lens module 10.

Furthermore, the lens module 10 satisfies the following expressions:

$$R_1/f < 1;$$

$$-3 < f_1/f < -1;$$

$$(Y_{12} - Y_{ref12})/Y_{ref12} < 4.5\%;$$

wherein $R_1$ represents a curvature radius of a center of the object side surface of the first lens L1, $f_1$ represents a focal length of the first lens L1, f represents a focal length of the lens module 10, $Y_{12}$ represents a real image height of the lens module 10 at 12° FOV, and $Y_{ref12}$ represents an ideal paraxial image height of the lens module 10 at 12° FOV.

Furthermore, the lens module 10 satisfies the following expression:

$$TTL/f < 4.5;$$

wherein TTL represents an optical total length of the lens module 10, and f represents a focal length of the lens module 10.

Furthermore, the lens module 10 satisfies the following expressions:

$$-1.5 < R_{21}/f < -0.8;$$

$$R_{41}/f < 1.8;$$

$$f/R_{52} < 0.2;$$

wherein $R_{21}$ represents a curvature radius of the object side surface of the second lens L2, $R_{41}$ represents a curvature radius of the object side surface of the fourth lens L4, and $R_{52}$ represents a curvature radius of the image side surface of the fifth lens L5.

Furthermore, the lens module 10 satisfies the following expressions:

$$R_{61}/f > 2;$$

$$f/f_6 < 0.5;$$

wherein $R_{61}$ represents a curvature radius of a center of the object side surface of the sixth lens L6, f represents a focal length of the lens module 10, and $f_6$ represents a focal length of the sixth lens L6.

Furthermore, the lens module 10 satisfies the following expression:

$f_3/f<2$;

wherein $f_3$ represents a focal length of the third lens L3, and f represents a focal length of the lens module 10.

Furthermore, the lens module 10 satisfies the following expressions:

$(dn/dt)4<-5\times10^{-6}/°$ C.;

$f_4/f<1.5$;

wherein $(dn/dt)4$ represents a temperature coefficient of refractive index of the fourth lens L4, f represents a focal length of the lens module 10, and $f_4$ represents a focal length of the fourth lens L4.

Furthermore, the lens module 10 satisfies the following expressions:

$Nd_1>1.8$, $Vd_4>55$, $Vd_5<25$, $Vd_6>60$;

wherein $Vd_4$ represents an abbe number of the fourth lens L4, $Vd_5$ represents an abbe number of the fifth lens L5, $Vd_6$ represents an abbe number of the sixth lens L6, and $Nd_1$ represents a refractive index of the first lens L1.

Furthermore, the shapes of the respective aspherical surfaces of the first lens L1 and the sixth lens L6 satisfy the following expression:

$$z = \frac{ch^2}{1+\sqrt{1-(1+K)c^2h^2}} + Bh^4 + Ch^6 + Dh^8 + Eh^{10} + Fh^{12};$$

wherein z represents a vector height between a point on the surface and a vertex of the surface along an optical axis of the lens module; h represents a distance between the point on the surface and the optical axis, c represents a curvature of the vertex of the surface, K represents a quadratic surface coefficient, B represents a fourth order surface coefficient, C represents a sixth order surface coefficient, D represents an eighth order surface coefficient, E represents a tenth order surface coefficient, and F represents a twelfth order surface coefficient.

The lens module 10 that satisfies the above configuration not only maintains a small lens outer diameter and length, but also provide a particular distortion by being equipped with the first lens L1 with a glass aspheric surface. Because the sixth lens L6 include a glass aspheric surface, an astigmatism of the lens module 10 is effectively reduced, and the resolution capability of the lens module 10 is greatly improved. Furthermore, the lens module 10 provided by the present disclosure may optimize the lens ghost by controlling the shape of the lenses and improve the quality of image. The lens module 10 equipped with all glass-made lenses, may ensure the long-term stability of the lens in outdoor high and low temperature environments.

The following further describes the present disclosure in multiple embodiments. In each of the following embodiments, the thickness and curvature radius of each lens in the lens module 10 are different. For specific differences, see the parameter tables in the embodiments. The following examples are merely preferred embodiments of the present disclosure, but the embodiments of the present disclosure are not limited only by the following examples. Any other changes, substitutions, combinations, or simplifications that do not depart from the innovation of the present disclosure should be regarded as equivalent replacement methods, and all are included in the protection scope of the present disclosure.

Embodiment 1

Figure 2A:
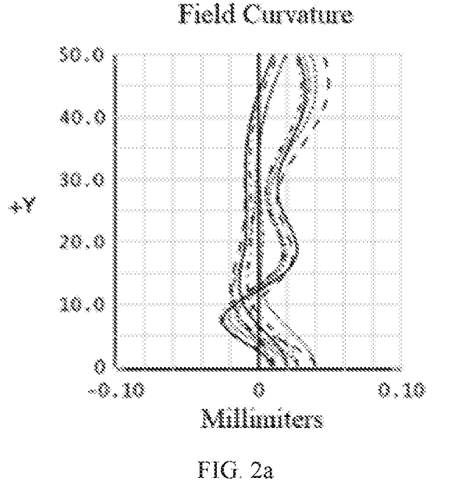
FIG. 2a illustrates a field curvature diagram of the lens module according to the first embodiment of the present disclosure.
Figure 2B:
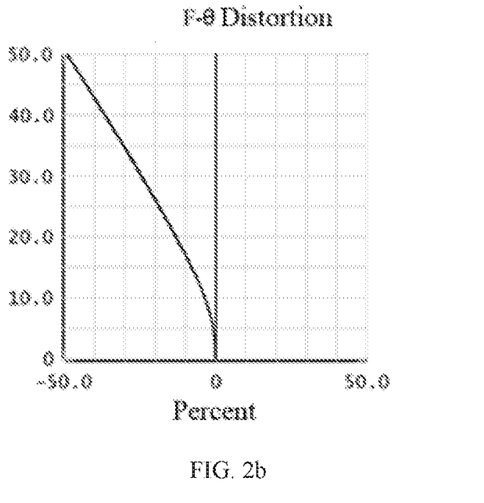
FIG. 2b illustrates a distortion diagram of the lens module according to the first embodiment of the present disclosure.

A schematic cross-sectional view of the lens module 10 according to the first embodiment is illustrated in FIG. 1. A field curvature diagram of the lens module 10 according to the first embodiment is illustrated in FIG. 2a and FIG. 2b. Related parameters of each lens in the lens module 10 according to the first embodiment are shown in Table 1-1.

TABLE 1-1

|  | Surface No. | Surface type | Curvature radius | Thickness | Refractive index | Abbe number |
| --- | --- | --- | --- | --- | --- | --- |
| Subject | — | Plane | Infinity | Infinity | — | — |
| First lens | S1 | Aspheric surface | 4.478743 | 2.256017 | 1.81 | 40.9 |
|  | S2 | Aspheric surface | 2.266115 | 3.353162 | — | — |
| Second lens | S3 | Spherical surface | −6.21751 | 2.117002 | 1.64 | 55.5 |
|  | S4 | Spherical surface | −8.12463 | 0.065315 | — | — |
| Third lens | S5 | Spherical surface | 11.29939 | 3.163642 | 1.69 | 54.9 |
|  | S6 | Spherical surface | −11.2994 | −0.10244 | — | — |
| Stop | S7 | Spherical surface | Infinity | 1.866839 | — | — |
| Fourth lens | S8 | Spherical surface | 9.622295 | 3.562642 | 1.59 | 68.5 |
|  | S9 | Spherical surface | −4.91578 | 0.005 | 1.52 | 50 |
| Fifth lens | S10 | Spherical surface | −4.91578 | 0.80962 | 1.85 | 23.8 |
|  | S11 | Spherical surface | −18.8419 | 1.183007 | — | — |
| Sixth lens | S12 | Aspheric surface | 14.77657 | 2.417207 | 1.52 | 70.1 |
|  | S13 | Aspheric surface | 35.31914 | 0.15 | — | — |
| Filter | S14 | Plane | Infinity | 0.4 | 1.52 | 64.2 |
|  | S15 | Plane | Infinity | 2.126475 | — | — |
| Cover glass | S16 | Plane | Infinity | 0.5 | 1.52 | 64.2 |
|  | S17 | Plane | Infinity | 0.134252 | — | — |
| Image surface | S18 | Plane | Infinity |  | — | — |

The parameters of the aspheric surfaces of the first lens L1 and the sixth lens L6 of this embodiment are shown in Table 1-2.

TABLE 1-2

| Surface No. | K | B | C | D | E | F |
|---|---|---|---|---|---|---|
| S1 | −0.948 | −9.013e−04 | −1.823e−04 | 7.070e−06 | −8.622e−08 | 0 |
| S2 | −0.656 | −4.836e−03 | −8.743e−04 | 7.796e−05 | −3.305e−06 | 0 |
| S12 | −1.535 | −1.715e−03 | 1.266e−04 | −9.217e−06 | 3.049e−07 | −2.629e−09 |
| S13 | 14.999 | −4.127e−03 | 3.122e−04 | −1.883e−05 | 6.138e−07 | −7.701e−09 |

Embodiment 2

Figure 3:
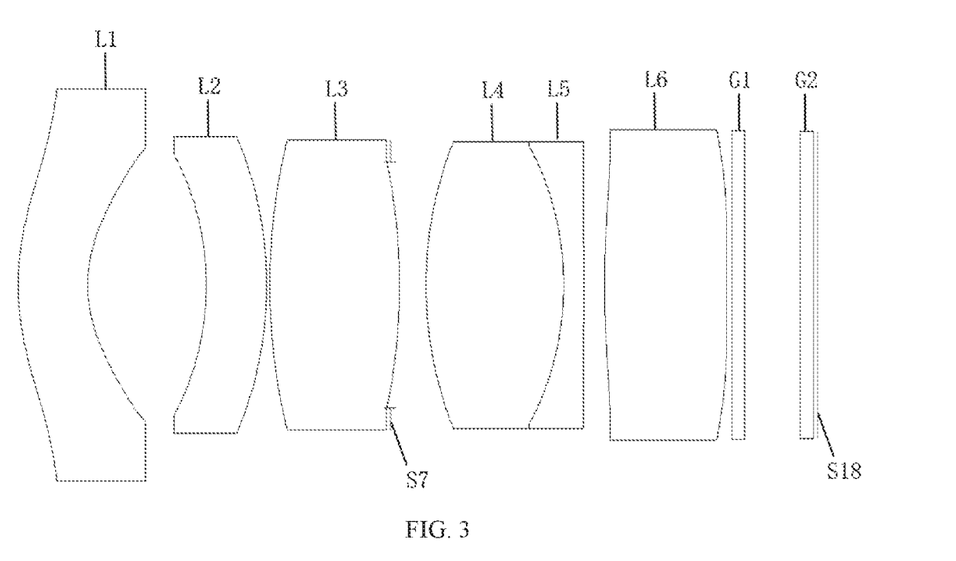
FIG. 3 illustrates a schematic cross-sectional view of the lens module according to a second embodiment of the present disclosure.
Figure 4A:
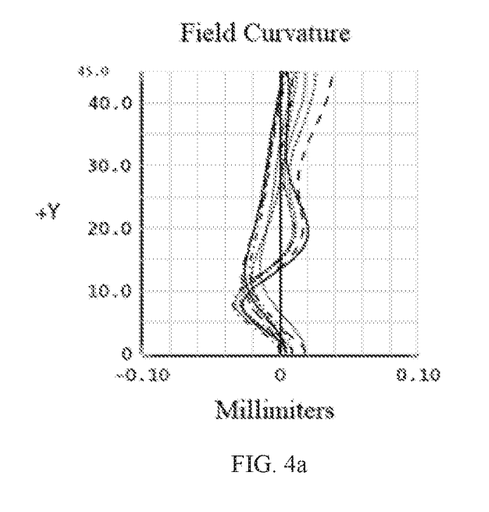
FIG. 4a illustrates a field curvature diagram of the lens module according to the second embodiment of the present disclosure.
Figure 4B:
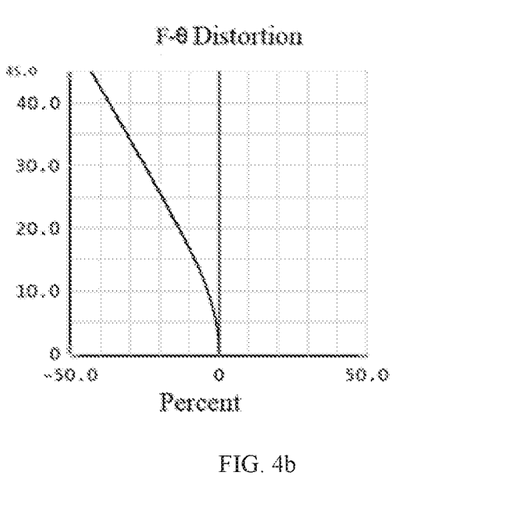
FIG. 4b illustrates a distortion diagram of the lens module according to the second embodiment of the present disclosure.

A schematic cross-sectional view of the lens module according to the second embodiment is illustrated in FIG. 3. A field curvature diagram of the lens module according to the second embodiment is illustrated in FIG. 4a and FIG. 4b. Related design parameters of each lens in the lens module according to the second embodiment are shown in Table 2-1.

TABLE 2-1

| | Surface No. | Surface type | Curvature radius | Thickness | Refractive index | Abbe number |
|---|---|---|---|---|---|---|
| Subject | — | Plane | Infinity | Infinity | — | — |
| First lens | S1 | Aspheric surface | 4.838256 | 2.087534 | 1.81 | 40.9 |
| | S2 | Aspheric surface | 2.571794 | 3.557661 | — | — |
| Second lens | S3 | Spherical surface | −5.38627 | 1.813837 | 1.90 | 31.3 |
| | S4 | Spherical surface | −7.26476 | 0.097007 | — | — |
| Third lens | S5 | Spherical surface | 11.43274 | 3.890719 | 1.69 | 54.9 |
| | S6 | Spherical surface | −11.4327 | −0.2738 | — | — |
| Stop | S7 | Spherical surface | Infinity | 1.074281 | — | — |
| Fourth lens | S8 | Spherical surface | 7.417865 | 4.130265 | 1.59 | 68.5 |
| | S9 | Spherical surface | −5.70268 | 0.005 | 1.52 | 50 |
| Fifth lens | S10 | Spherical surface | −5.70268 | 0.598489 | 1.85 | 23.8 |
| | S11 | Spherical surface | −7924.8 | 0.626654 | — | — |
| Sixth lens | S12 | Aspheric surface | 16.07422 | 3.665452 | 1.52 | 70.1 |
| | S13 | Aspheric surface | 59.68892 | 0.15 | — | — |
| Filter | S14 | Plane | Infinity | 0.4 | 1.52 | 64.2 |
| | S15 | Plane | Infinity | 1.659725 | — | — |
| Cover glass | S16 | Plane | Infinity | 0.4 | 1.52 | 64.2 |
| | S17 | Plane | Infinity | 0.125447 | — | — |
| Image surface | S18 | Plane | Infinity | | — | — |

The parameters of the aspheric surfaces of the first lens L1 and the sixth lens L6 of this embodiment are shown in Table 2-2.

TABLE 2-2

| Surface No. | K | B | C | D | E | F |
|---|---|---|---|---|---|---|
| S1 | −0.768 | −1.487e−03 | −1.800e−04 | 8.693e−06 | −1.244e−07 | 0 |
| S2 | −0.572 | −5.219e−03 | −6.481e−04 | 5.900e−05 | −2.117e−06 | 0 |
| S12 | 5.527 | −1.979e−03 | 8.525e−05 | −9.309e−06 | 4.719e−07 | 0 |
| S13 | −7.216 | −4.821e−03 | 3.742e−04 | −2.597e−05 | 1.194e−06 | 0 |

Embodiment 3

Figure 5:
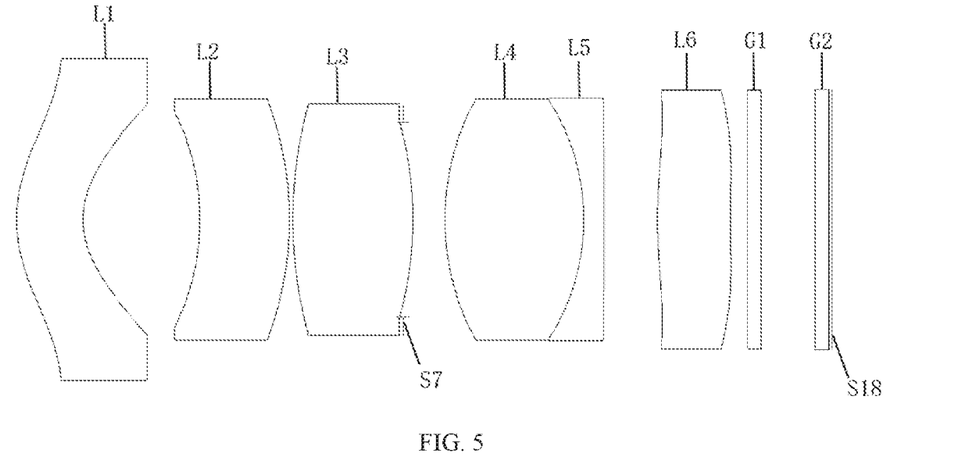
FIG. 5 illustrates a schematic cross-sectional view of the lens module according to third embodiment of the present disclosure.
Figure 6A:
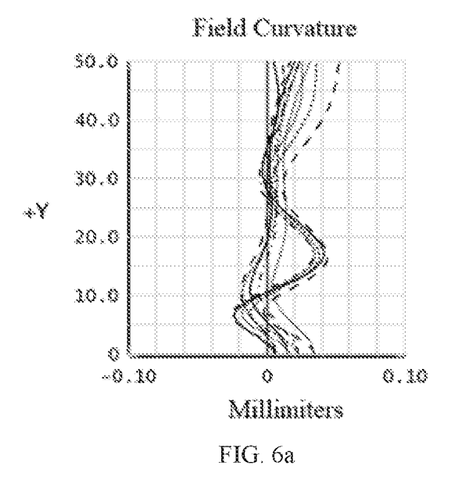
FIG. 6a illustrates a field curvature diagram of the lens module according to the third embodiment of the present disclosure.
Figure 6B:
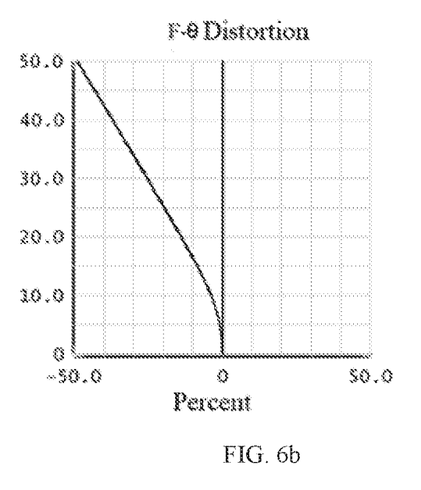
FIG. 6b illustrates a distortion diagram of the lens module according to the third embodiment of the present disclosure.

A schematic cross-sectional view of the lens module according to the third embodiment is illustrated in FIG. 5. A field curvature diagram of the lens module according to the third embodiment is illustrated in FIG. 6a and FIG. 6b. Related design parameters of each lens in the lens module according to the third embodiment are shown in Table 3-1.

TABLE 3-1

|  | Surface No. | Surface type | Curvature radius | Thickness | Refractive index | Abbe number |
|---|---|---|---|---|---|---|
| Subject | — | Plane | Infinity | Infinity | — | — |
| First lens | S1 | Aspheric surface | 4.384313 | 1.955523 | 1.81 | 40.9 |
|  | S2 | Aspheric surface | 2.486175 | 3.438369 | — | — |
| Second lens | S3 | Spherical surface | −7.10429 | 2.634684 | 1.95 | 32.3 |
|  | S4 | Spherical surface | −9.83808 | 0.099977 | — | — |
| Third lens | S5 | Spherical surface | 12.84571 | 3.53053 | 1.61 | 55.1 |
|  | S6 | Spherical surface | −10.7629 | −0.28793 | — | — |
| Stop | S7 | Spherical surface | Infinity | 1.232792 | — | — |
| Fourth lens | S8 | Spherical surface | 7.402686 | 4.082569 | 1.59 | 68.5 |
|  | S9 | Spherical surface | −6.5001 | 0.005 | 1.52 | 50 |
| Fifth lens | S10 | Spherical surface | −6.5001 | 0.6 | 1.81 | 22.7 |
|  | S11 | Spherical surface | −199.298 | 1.57034 | — | — |
| Sixth lens | S12 | Aspheric surface | 14.56867 | 2.143664 | 1.60 | 65.3 |
|  | S13 | Aspheric surface | 29.44758 | 0.5 | — | — |
| Filter | S14 | Plane | Infinity | 0.4 | 1.52 | 64.2 |
|  | S15 | Plane | Infinity | 1.586954 | — | — |
| Cover glass | S16 | Plane | Infinity | 0.4 | 1.52 | 64.2 |
|  | S17 | Plane | Infinity | 0.112532 | — | — |
| Image surface | S18 | Plane | Infinity |  | — | — |

The parameters of the aspheric surfaces of the first lens L1 and the sixth lens L6 of this embodiment are shown in Table 3-2.

TABLE 3-2

| Surface No. | K | B | C | D | E | F |
|---|---|---|---|---|---|---|
| S1 | −0.818 | −1.059e−03 | −2.398e−04 | 1.060e−05 | −1.486e−07 | 0 |
| S2 | −0.619 | −4.151e−03 | −9.312e−04 | 8.436e−05 | −3.107e−06 | 0 |
| S12 | −5.981 | −2.565e−03 | 1.755e−04 | −1.649e−05 | 5.955e−07 | 0 |
| S13 | −13.599 | −5.374e−03 | 4.092e−04 | −2.369e−05 | 6.725e−07 | 0 |

Embodiment 4

Figure 7:
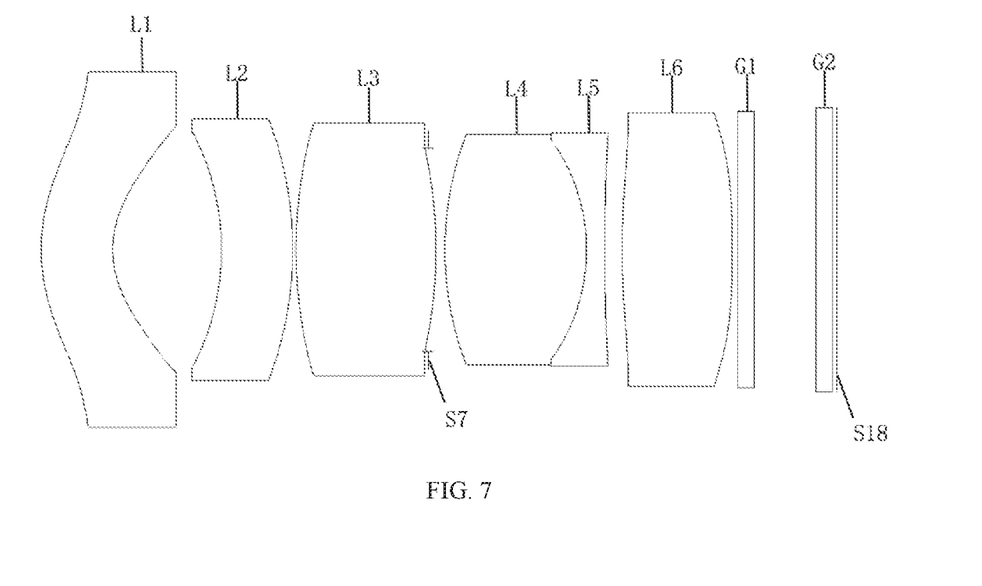
FIG. 7 illustrates a schematic cross-sectional view of the lens module according to a fourth embodiment of the present disclosure.
Figure 8A:
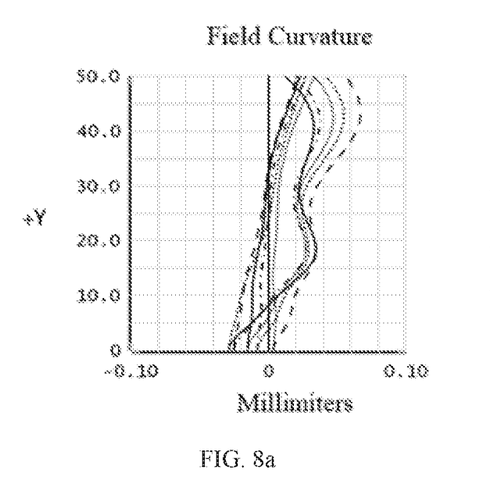
FIG. 8a illustrates a field curvature diagram of the lens module according to the fourth embodiment of the present disclosure.
Figure 8B:
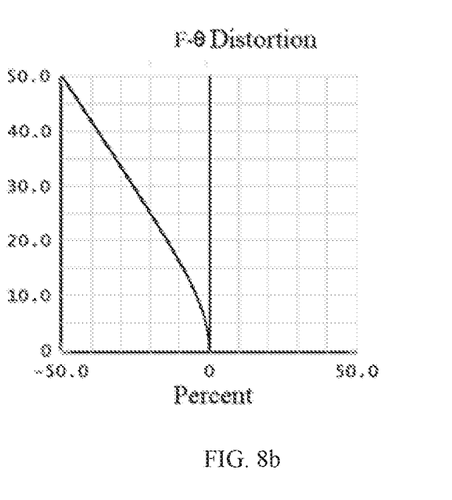
FIG. 8b illustrates a distortion diagram of the lens module according to the fourth embodiment of the present disclosure.

A schematic cross-sectional view of the lens module according to the fourth embodiment is illustrated in FIG. 7. A field curvature diagram of the lens module according to the fourth embodiment is illustrated in FIG. 8a and FIG. 8b. Related design parameters of each lens in the lens module according to the fourth embodiment are shown in Table 4-1.

TABLE 4-1

|  | Surface No. | Surface type | Curvature radius | Thickness | Refractive index | Abbe number |
|---|---|---|---|---|---|---|
| Subject | — | Plane | Infinity | Infinity | — | — |
| First lens | S1 | Aspheric surface | 4.364936 | 2.158898 | 1.81 | 40.9 |
|  | S2 | Aspheric surface | 2.404071 | 3.27911 | — | — |
| Second lens | S3 | Spherical surface | −6.17539 | 2.149924 | 1.95 | 32.3 |
|  | S4 | Spherical surface | −8.87064 | 0.099848 | — | — |
| Third lens | S5 | Spherical surface | 11.30523 | 4.220957 | 1.61 | 55.1 |
|  | S6 | Spherical surface | −11.3052 | −0.23525 | — | — |
| Stop | S7 | Spherical surface | Infinity | 0.507302 | — | — |
| Fourth lens | S8 | Spherical surface | 7.848862 | 4.268829 | 1.59 | 68.5 |
|  | S9 | Spherical surface | −4.6335 | 0.005 | 1.52 | 50 |
| Fifth lens | S10 | Spherical surface | −4.6335 | 0.549899 | 1.81 | 22.7 |
|  | S11 | Spherical surface | 49.6618 | 0.523369 | — | — |
| Sixth lens | S12 | Aspheric surface | 16.08075 | 3.327354 | 1.60 | 65.3 |
|  | S13 | Aspheric surface | −30.5119 | 0.15 | — | — |

TABLE 4-1-continued

| | Surface No. | Surface type | Curvature radius | Thickness | Refractive index | Abbe number |
|---|---|---|---|---|---|---|
| Filter | S14 | Plane | Infinity | 0.5 | 1.52 | 64.2 |
| | S15 | Plane | Infinity | 1.877865 | — | — |
| Cover glass | S16 | Plane | Infinity | 0.5 | 1.52 | 64.2 |
| | S17 | Plane | Infinity | 0.121894 | — | — |
| Image surface | S18 | Plane | Infinity | | — | — |

The parameters of the aspheric surfaces of the first lens L1 and the sixth lens L6 of this embodiment are shown in Table 4-2.

TABLE 4-2

| Surface No. | K | B | C | D | E | F |
|---|---|---|---|---|---|---|
| S1 | −3.727 | 3.222e−03 | −3.813e−04 | 1.309e−05 | −1.591e−07 | 0 |
| S2 | −0.626 | −4.079e−03 | −9.308e−04 | 7.204e−05 | −2.458e−06 | 0 |
| S12 | 5.135 | −1.788e−03 | 3.544e−05 | 3.075e−06 | −8.204e−07 | 4.001e−08 |
| S13 | 2.273 | −3.514e−03 | 2.113e−04 | −7.597e−06 | 4.131e−08 | 5.228e−09 |

In summary, according to the description in the foregoing first, second third, and fourth embodiments, the related optical parameter of the lens module provided by present disclosure is shown in Table 5.

As illustrated in table 5, table 5 shows optical characteristics corresponding of each of the first, second third, and fourth embodiments. Table 5 includes the system focal length f, the system optical total length TTL, the aperture number F#, and the field angle 2θ of the lens module.

TABLE 5

| Expression | Embodiment 1 | Embodiment 2 | Embodiment 3 | Embodiment 4 |
|---|---|---|---|---|
| f(mm) | 6.305 | 6.293 | 6.3 | 6.38 |
| TTL(mm) | 24 | 24 | 24 | 24 |
| F# | 1.63 | 1.62 | 1.61 | 1.615 |
| 2θ | 100° | 100° | 100° | 100° |
| $D1/(Y_{IH}*f)$ | 0.199 | 0.247 | 0.196865 | 0.1964 |
| TTL/f | 3.81 | 3.81 | 3.809533 | 3.761066 |
| R1/f | 0.71 | 0.7688 | 0.695924 | 0.684 |
| f1/f | −1.65 | −1.831431 | −2.087202 | −2.04 |
| (Y12−Yref12)/Yref12 | −5.1% | −5.25% | −5.5% | −5.9% |
| R21/f | −0.986 | −0.855887 | −1.127667 | −0.9677 |
| R41/f | 1.526 | 1.178712 | 1.175 | 1.2385 |
| f/R52 | −0.33 | −0.0008 | −0.03 | 0.128 |
| R61/f | 2.34 | 2.554 | 2.312493 | 2.52 |
| f/f6 | 0.135 | 0.1535 | 0.137962 | 0.308 |
| f3/f | 1.37 | 1.4069 | 1.598485 | 1.3821 |
| (dn/dt)4 (unit: 10-6/°C.) | −7.4 | −7.4 | −7.4 | −7.4 |
| f4/f | 0.95 | 0.975783 | 1.037106 | 0.8797 |

Figure 9:
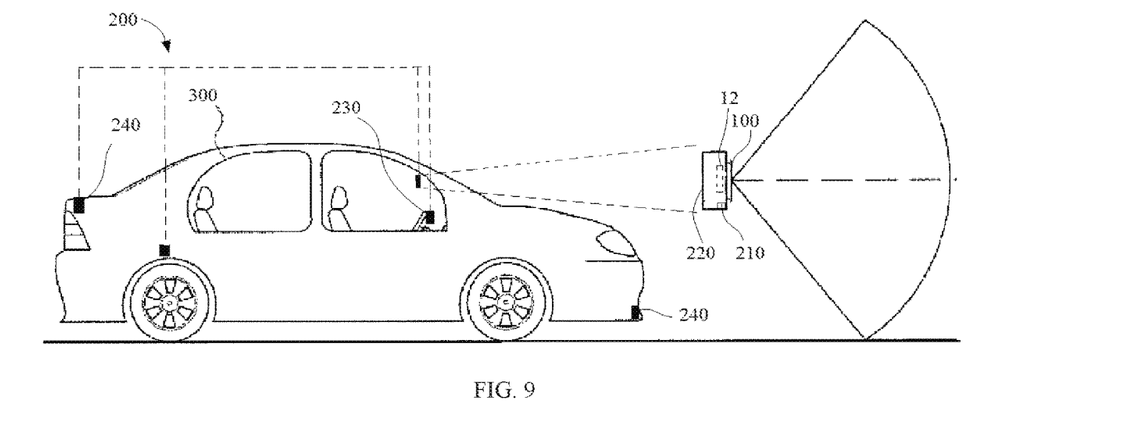
FIG. 9 illustrates a schematic view of a camera and a driver assistant system according to one embodiment of the present disclosure.

As illustrated in FIG. 9, the present disclosure further provides a camera 100 and a drive recorder 200 having the camera 100.

The camera 100 includes the lens module 10 of any one of the embodiments described above and an image sensor 12. The image sensor 12 is disposed at an image side of the lens module 10. For example, the image sensor 12 may face the image surface S18 of the lens module 10. The image sensor 12 is configured to generate images basing on lights captured by the lens module 10.

The driver assistant system 200 may be installed in a vehicle 300, and the driver assistant system 200 may include a data acquisition module such as the camera 100 and a microphone 210 mounted in the vehicle 300. The data acquisition module is used for acquiring driving data such as images and sounds during driving. Optionally, the driver assistant system 200 further includes a display screen 220 for displaying the acquired driving data in real time. The display screen 220 may be a touch display screen. The driver assistant system 200 is further used to receive and respond to touch operations acting on the touch display screen.

The driver assistant system 200 may further include a memory, a processor 230 and sensors 240 such as radar sensors, laser sensors or the like. The processor is configured to process the data such as image data and audio data obtained by the data acquisition module and the sensors 2440. The memory is configured to store the data obtained by the data acquisition module. It is in particular to be noted that the term "sensors" according to the present invention also comprises virtual sensors. Such virtual sensor may be for example a GPS which is able to determine a current absolute position of the vehicle in spatial coordinates. Such spatial coordinates are then considered to represent a sensor output of a GPS sensor. Also a map database is considered to be such virtual sensor, because digital maps allow easy access to important data like geometrical road configuration, number and width of lanes as well as incoming or outgoing road segments of an intersection. The sensor results of the sensors 240 is transmitted to the processor 230. The processor 230 is configured to extract situation features (or descriptors) from the sensor results. Such feature extraction per se is already known from other prior art systems and thus the details thereof are not explained repeatedly. The processor 230 is further configured to generate driving information according to the sensor results, and vehicle operation controls may be actuated by the driver assistant system 200. The driver assistant system 200 may be further applied in an automated driving vehicle.

In the present illustrated embodiment, the camera 100 and the lens module 100 are applied in the driver assistant system 200 of the vehicle 300 such as a car. In other embodiments, the camera 100 and the lens module 10 may also be applied in other imaging device such as a flip camera, a pocket camera, an SLR(Single Lens Reflex) camera, a sport camera, a imaging component of an UAV (Unmanned Aerial Vehicle), etc.

In the description of this specification, the description with reference to the terms "one embodiment", "some embodiments", "examples", "specific examples", or "some examples" and the like means specific features described in conjunction with the embodiments or examples, structures, materials, or features are included in at least one embodiment or example of the disclosure. In this specification, the schematic expressions of the above terms do not necessarily refer to the same embodiment or example. Furthermore, the particular features, structures, materials, or characteristics described may be combined in any suitable manner in any one or more embodiments or examples.

The above-mentioned embodiments are merely illustrative of several embodiments of the present disclosure, and the description thereof is more specific and detailed, however is not to be construed as limiting the scope of the disclosure. It should be noted that various variations and modifications may be made by those skilled in the art without departing from the spirit and scope of the disclosure. Therefore, the scope of the disclosure should be determined by the appended claims.

What is claimed is:

1. A lens module, from an object side to an image side thereof, the lens module sequentially comprising:
   a first lens with a negative refractive power, whose object side surface is convex and image side surface is concave;
   a second lens with a negative refractive power, whose object side surface is concave and image side surface is convex;
   a third lens with a positive refractive power, whose object side surface and image side surface are both convex;
   a stop;
   a fourth lens with a positive refractive power, whose object side surface and image side surface are both convex;
   a fifth lens with a negative refractive power, whose object side surface is concave surface;
   wherein the fifth lens and the fourth lens constitute a bonding lens group;
   a sixth lens with a positive refractive power, whose object side surface is convex; and
   a filter;
   wherein the second lens, the third lens, the fourth lens, and the fifth lens are glass spherical lenses; and the first lens and the sixth lens are both glass aspherical lenses;
   wherein the lens module satisfies the following expressions:

$$-1.5<R_{21}/f<-0.8;$$

$$R_{41}/f<1.8;$$

$$f/R_{52}<0.2;$$

where $R_{21}$ represents a curvature radius of the object side surface of the second lens;
   $R_{41}$ represents a curvature radius of the object side surface of the fourth lens;
   $R_{52}$ represents a curvature radius of the image side surface of the fifth lens; and
   f represents a focal length of the lens module.

2. The lens module as claimed in claim 1, wherein the lens module satisfies the following expression:

$$D_1/(Y_{IH}*f)<0.25;$$

where $D_1$ represents a maximum effective diameter of the first lens;
   $Y_{IH}$ represents a maximum image circle radius of the lens module.

3. The lens module as claimed in claim 1, wherein the lens module satisfies the following expressions:

$$R_1/f<1;$$

$$-3<f_1/f<-1;$$

$$(Y_{12}-Y_{ref12})/Y_{ref12}<-4.5\%;$$

where $R_1$ represents a curvature radius of a center of the object side surface of the first lens;
   $f_1$ represents a focal length of the first lens;
   $Y_{12}$ represents a real image height of the lens module at 12° FOV; and
   $Y_{ref12}$ represents an ideal paraxial image height of the lens module at 12° FOV.

4. The lens module as claimed in claim 1, wherein the lens module satisfies the following expression:

$$TTL/f<4.5;$$

where TTL represents an optical total length of the lens module from the most object side surface of the most object side lens to the image plane.

5. The lens module as claimed in claim 1, wherein the lens module satisfies the following expressions:

$$R_{61}/f<2;$$

$$f/f_6<0.5;$$

where $R_{61}$ represents a curvature radius of a center of the object side surface of the sixth lens; and
   $f_6$ represents a focal length of the sixth lens.

6. The lens module as claimed in claim 1, wherein the lens module satisfies the following expression:

$$f_3/f<2;$$

where $f_3$ represents a focal length of the third lens.

7. The lens module as claimed in claim 1, wherein the lens module satisfies the following expressions:

$(dn/dt)4 < -5 \times 10^{-6} /°C.$;

$f_4/f < 1.5$;

where $(dn/dt)4$ represents a temperature coefficient of refractive index of the fourth lens; and $f_4$ represents a focal length of the fourth lens.

8. The lens module as claimed in claim 1, wherein the lens module satisfies the following expressions:

$Nd_1 > 1.8, Vd_4 > 55, Vd_5 < 25, Vd_6 > 60$;

where $Vd_4$ represents an abbe number of the fourth lens; $Vd_5$ represents an abbe number of the fifth lens; $Vd_6$ represents an abbe number of the sixth lens; and $Nd_1$ represents a refractive index of the first lens.

9. The lens module as claimed in claim 1, wherein the shapes of the respective aspherical surfaces of the first lens and the sixth lens satisfy the following expression:

$$z = \frac{ch^2}{1 + \sqrt{1 - (1+K)c^2 h^2}} + Bh^4 + Ch^6 + Dh^8 + Eh^{10} + Fh^{12};$$

where z represents a vector height between a point on the surface and a vertex of the surface along an optical axis of the lens module;

h represents a distance between the point on the surface and the optical axis;

c represents a curvature of the vertex of the surface;

K represents a quadratic surface coefficient;

B represents a fourth order surface coefficient;

C represents a sixth order surface coefficient;

D represents an eighth order surface coefficient;

E represents a tenth order surface coefficient; and

F represents a twelfth order surface coefficient.

10. The lens module as claimed in claim 1, further comprising a cover glass disposed at an image side of the filter.

11. A camera, comprising a lens module and an image sensor disposed at an image side of the lens module; wherein from an object side to an image side thereof, the lens module comprises:

a first lens with a negative refractive power, whose object side surface is convex and image side surface is concave;

a second lens with a negative refractive power, whose object side surface is concave and image side surface is convex;

a third lens with a positive refractive power, whose object side surface and image side surface are both convex;

a stop;

an achromatic doublet lens comprising a fourth lens with a positive refractive power and a fifth lens with a negative refractive power, wherein an object side surface of the fifth lens is matched with and bonded to an image side surface of the fourth lens;

a sixth lens with a positive refractive power, whose object side surface is convex;

a filter; and a cover glass disposed at an image side of the filter;

wherein the second lens, the third lens, the fourth lens, and the fifth lens are glass spherical lenses; and the first lens and the sixth lens are both glass aspherical lenses;

wherein the lens module satisfies the following expressions:

$-1.5 < R_{21}/f < -0.8$;

$R_{41}/f < 1.8$;

$f/R_{52} < 0.2$;

where $R_{21}$ represents a curvature radius of the object side surface of the second lens;

$R_{41}$ represents a curvature radius of the object side surface of the fourth lens;

$R_{52}$ represents a curvature radius of the image side surface of the fifth lens; and f represents a focal length of the lens module.

12. The camera as claimed in claim 11, wherein the lens module satisfies the following expression:

$D_1/(Y_{IH} * f) < 0.25$;

where $D_1$ represents a maximum effective diameter of the first lens;

$Y_{IH}$ represents a maximum image circle radius of the lens module.

13. The camera as claimed in claim 11, wherein the lens module satisfies the following expressions:

$R_1/f < 1$;

$-3 < f_1/f < -1$;

$(Y_{12} - Y_{ref12})/Y_{ref12} < -4.5\%$;

where $R_1$ represents a curvature radius of a center of the object side surface of the first lens;

$f_1$ represents a focal length of the first lens;

$Y_{12}$ represents a real image height of the lens module at 12° FOV; and $Y_{ref12}$ represents an ideal paraxial image height of the lens module at 12° FOV.

14. The camera as claimed in claim 11, wherein the lens module satisfies the following expression:

$TTL/f < 4.5$;

where TTL is 24 mm; where TTL represents an optical total length of the lens module from the most object side surface of the most object side lens to the image plane.

15. The camera as claimed in claim 12, wherein the lens module satisfies the following expressions:

$R_{61}/f < 2$;

$f/f_6 < 0.5$;

where $R_{61}$ represents a curvature radius of a center of the object side surface of the sixth lens; and $f_6$ represents a focal length of the sixth lens.

16. The camera as claimed in claim 11, wherein the lens module satisfies the following expressions:

$(dn/dt)4 < -5 \times 10^{-6} /°C.$;

$f_4/f < 1.5$;

where $(dn/dt)4$ represents a temperature coefficient of refractive index of the fourth lens; and $f_4$ represents a focal length of the fourth lens.

17. The camera as claimed in claim 11, wherein the shapes of the respective aspherical surfaces of the first lens and the sixth lens satisfy the following expression:

$$z = \frac{ch^2}{1+\sqrt{1-(1+K)c^2h^2}} + Bh^4 + Ch^6 + Dh^8 + Eh^{10} + Fh^{12};$$

where z represents a vector height between a point on the surface and a vertex of the surface along an optical axis of the lens module;

h represents a distance between the point on the surface and the optical axis;

c represents a curvature of the vertex of the surface;

K represents a quadratic surface coefficient;

B represents a fourth order surface coefficient;

C represents a sixth order surface coefficient;

D represents an eighth order surface coefficient;

E represents a tenth order surface coefficient; and

F represents a twelfth order surface coefficient.

18. A driver assistant system, comprising a lens module and a processor; wherein from an object side to an image side thereof, the lens module comprises:

a first lens with a negative refractive power, whose object side surface is convex and image side surface is concave;

a second lens with a negative refractive power, whose object side surface is concave and image side surface is convex;

a third lens with a positive refractive power, whose object side surface and image side surface are both convex;

a stop;

an achromatic doublet lens comprising a fourth lens with a positive refractive power and a fifth lens with a negative refractive power;

a sixth lens with a positive refractive power, whose object side surface is convex; and a filter;

wherein the second lens, the third lens, the fourth lens, and the fifth lens are spherical lenses;

the first lens and the sixth lens are both aspherical lenses, and the lens module satisfies the expressions:

$(Y^{12} - Y_{ref12})/Y_{ref12} < -4.5\%;$ $-1.5 < R_{21}/f < -0.8;$ $R_{41}/f < 1.8;$ and $f/R_{52} < 0.2;$ where $Y_{12}$ represents a real image height of the lens module at 12° FOV, and $V_{ref12}$ represents an ideal paraxial image height of the lens module at 12° FOV, $R_{21}$ represents a curvature radius of the object side surface of the second lens, $R_{41}$ represents a curvature radius of the object side surface of the fourth lens, $R_{52}$ represents a curvature radius of the image side surface of the fifth lens; and f represents a focal length of the lens module.

\* \* \* \* \*